United States Patent
Burkhardt

(10) Patent No.: US 10,282,119 B1
(45) Date of Patent: May 7, 2019

(54) METHODS OF PAIRWISE COMBINATIONS IN STREAMING DATA

(71) Applicant: The United States of America as represented by the Director, National Security Agency, Washington, DC (US)

(72) Inventor: Paul Burkhardt, North Potomac, MD (US)

(73) Assignee: The United States of America, as represented by the Director, National Security Agency, Washington, DC (US)

( * ) Notice: Subject to any disclaimer, the term of this patent is extended or adjusted under 35 U.S.C. 154(b) by 301 days.

(21) Appl. No.: 15/072,483

(22) Filed: Mar. 17, 2016

(51) Int. Cl.
*G06F 3/06* (2006.01)
*G06F 9/30* (2018.01)
*G06F 16/2455* (2019.01)

(52) U.S. Cl.
CPC .......... *G06F 3/0629* (2013.01); *G06F 3/0604* (2013.01); *G06F 3/0683* (2013.01); *G06F 9/30098* (2013.01); *G06F 16/24568* (2019.01)

(58) Field of Classification Search
CPC .... G06F 3/0629; G06F 3/0604; G06F 3/0683; G06F 9/30098; G06F 17/30516
See application file for complete search history.

(56) References Cited

U.S. PATENT DOCUMENTS

| | | | | |
|---|---|---|---|---|
| 2008/0116449 | A1* | 5/2008 | Macready | B82Y 10/00 257/31 |
| 2016/0239868 | A1* | 8/2016 | Demsey | H04W 4/029 |

OTHER PUBLICATIONS

Ernesto Estrada and Philip A. Knight; A First Course in Network Theory; 269 pages (Year: 2015).*
Kiefer, Tim, et. al.; Pairwise Element Computation with MapReduce; HPDC'10, Jun. 20-25, 2010, Chicago, IL USA.
Burkhardt, P., Asking Hard Graph Questions, Beyond Watson: Pred. Anal. and Big Data; avail at http://cybersecurity.umbc.edu/files/2014/02/hard_graph_nsa_rd_2014_50001v1.pdf.

* cited by examiner

*Primary Examiner* — S. Sough
*Assistant Examiner* — Kimberly L Jordan

(57) ABSTRACT

A method is disclosed for pairwise combination of data elements of an input data stream. Steps are performed for each data element. A master controller reads the data from the stream and increments a counter. A register is instantiated, holding at least two words of memory and corresponding to the counter, by updating a register map and sending a message to a target processor via a logical pathway. The message instructs the target processor to create the register in local memory, including first and second memory locations, and an index corresponding to a value i. The target processor copies the data into the first memory location. For every other register corresponding to a value less than i, the other register copies the data into the second memory location and outputs a unique pair, constructed from the data elements stored at the first and second memory locations, to a database.

3 Claims, 1 Drawing Sheet

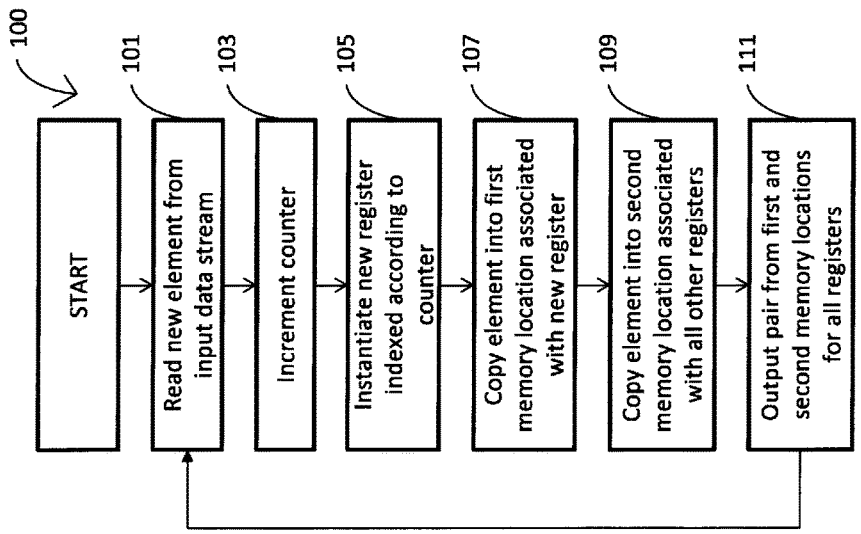

METHODS OF PAIRWISE COMBINATIONS IN STREAMING DATA

FIELD OF INVENTION

The present invention relates, in general, to processing streaming data and, in particular, to methods of organizing and combining data elements into pairs.

BACKGROUND OF THE INVENTION

Pairwise combinations from a set of elements have various applications in probability and statistics. For example, the problem of determining the chance of randomly picking a specific pair of items may be analyzed by performing all pairwise combinations of possible items. This is famously demonstrated in the probability of rolling a specific value such as "snake eyes", or a pair of ones, using two, six-sided dice. The probability is one out of thirty-six which is very low and requires a "lucky" roll since a pair of ones is just one outcome out of all possible (6×6=36) pairs. Each of the thirty-six pairs can be identified by the Cartesian product of two identical sets, {1,2,3,4,5,6}, yielding a new set of pairs, (1,1),(1,2),(1,3), and so on. The Cartesian product can be described in a step-wise fashion where the first element of the first set is paired with all elements of the second set, and this is then repeated for each of the remaining elements of the first set. To exclude permutations, where (y,x) is considered a duplicate of (x,y), the aforementioned steps can be modified so that each element of the first set skips over those elements whose values are less than itself. This can be further extended to ignore pairs of equal value, e.g. (x,x), resulting in only unique, pairwise combinations. For a given set of n elements the total number of unique, pairwise combinations is calculated by the binomial coefficient, $$\binom{n}{2} = \frac{n!}{2!(n-2)!} = \frac{n(n-1)}{2}$$

Thus, for a set of six elements there are a total of 6*5/2=15 unique pairs.

Constructing unique pairs is also an operation of many graph algorithms such as enumerating triangles and calculating all-pairs, vertex similarity. Given a graph G=(V,E) where V is the vertex set and E is the edge set, then let n=|V| and m=|E| be the number of vertices and edges, respectively. A vertex is a neighbor of another vertex if both are connected by an edge. A procedure to identify all triangles in a graph begins first by constructing all unique pairs of neighbors for each vertex, and then each such pair is tested to be neighbors themselves which would identify a triangle between that pair and the vertex from which the pair were first acquired.

SUMMARY

One embodiment of the present invention is a computer-implemented method of constructing pairwise combinations of data elements received from an input data stream, in a system logically coupled to a persistent database storage device. The system includes a plurality of parallel processors each having a local memory and an inter-processor communication (IPC) network. The system also includes a master controller having a local memory and logically coupled to the plurality of parallel processors via the IPC network. The master controller also is configured to receive data from the input data stream. The method includes performing a series of steps for each data element of the input data stream. The method includes, at the master controller, reading the data element from the input data stream into the master controller's local memory. The method also includes, at the master controller, incrementing a counter, i, where the counter i is stored in the master controller's local memory. The method also includes instantiating a register holding at least two words of memory and corresponding to the counter i. Instantiating the register includes updating a register map at the master controller, such that the register map defines, in association with a value of the counter, at least one logical pathway through the IPC network between the master controller and a target processor of the plurality of parallel processors associated with the register. Instantiating the register also includes sending a message from the master controller to the target processor via the logical pathway defined in the register map. The message instructs the target processor to create the register in the local memory at the target processor. The register includes a first memory location in the local memory at the target processor, a second memory location in the local memory at the target processor, and an index corresponding to the value i. The method also includes, at the target processor, receiving the data element from the master controller via the IPC network and copying the data element into the first memory location of the register corresponding to i. The method also includes, for every other register in the register map corresponding to a value less than i, at the processor associated with that other register, receiving the data element from the master controller via the IPC network and copying the data element into the second memory location of that other register corresponding to that value less than i, and outputting a unique pair, constructed from the data elements stored at the first and second memory locations, to the persistent database storage device.

In a related embodiment, each register that receives a data element receives the element from a source register having a higher corresponding value. In another related embodiment, the master controller includes a plurality of parallel processors and performs step in parallel for multiple elements of the input data stream by the plurality of parallel processors.

BRIEF DESCRIPTION OF THE DRAWINGS

FIG. 1 is a flow chart of a process in accordance with an embodiment of the present invention.

DETAILED DESCRIPTION

In discussing embodiments of the present invention, the term "register" may refer to a list, queue, file, memory address, CPU register, etc. A "register" will always be associated with at least enough memory to store two data elements.

In accordance with various embodiments of the present invention, methods are disclosed for generating all unique, pairwise combinations from a stream of elements. These methods allow for generation of the desired combinations without the need to reread elements from the stream. Rather, the stream of elements is read precisely once. Similarly, the generation process occurs in a streaming fashion such that it is unnecessary to capture the complete set of elements from the stream and store this set in either a random-access memory of a single computer or a single globally-shared data structure accessible by multiple processors. Satisfying such streaming data constraints is necessary for various applications, such as when accessing a large finite transmission of non-repeated symbols, in which case identifying all unique pairs according to conventional methods becomes very difficult as the size of the data set increases. Constructing all unique pairs is known to be a very intensive task, because the minimum number of calculations is $O(n^2)$ in the order of the input size. Furthermore, while certain prior art approaches have sought to parallelize this process to reduce the total computation time, such approaches have generally seen at most minor improvements, and may have required significant amounts of working memory and/or complicated inter-processor communication.

As is discussed in greater detail below, the inventor has appreciated that pairwise combinations may be constructed by distributing the elements to processors according to an ordering defined by the columns of a circulant matrix which is a special Toeplitz matrix having constant anti-diagonals, in which each column is a cyclic permutation of the previous column. Unique pairs can then be constructed in parallel by iterating locally at each processor over the elements as they arrive at the processor. Unlike the prior art approaches noted above, this approach allows the construction of pairwise combinations to be accomplished in a single pass and linear number of operations at each processor. Moreover, this can occur even with strict constraints on data access. Furthermore, the per-processor memory requirements are greatly reduced, namely, $2(n-1)/p$ words of memory per processor, where n is the total number of elements in the data stream and p is the number of processors. In an extreme case where the number of processors is $n-1$, the required memory for each processor could thus be as little as two words of memory, as long as each element can be stored in a single word of memory. In the case where the number of processors is much less than $n-1$ and each processor has as little as two words of memory, then the elements at each processor can be stored in a file or database until the time at which the process can load the elements into its memory.

The performance improvements noted above are achieved by eliminating redundant and repeated operations that may be performed according to prior art approaches. For example, rather than maintaining input elements in a globally-shared data structure, leading to constant competition from the processors sending I/O requests to the data structure, each processor can receive its own input sequentially from a master controller that reads the input data stream. The set of elements does not need to be sorted, and no portion of the set of elements needs to be saved in any location, other than the $2(n-1)/p$ words of local memory mentioned previously. Communication between the processors is not required, as each processor may receive all the information it needs, directly and passively, from the master controller. If desired, some limited amount of inter-processor communication may be leveraged according to certain embodiments, however. For example, processors that are spatially collocated in a neighborhood may send copies of data to one another. Such an arrangement could be leveraged to reduce the number of processors that must be addressed by the master controller.

A process for constructing unique pairs is now described with reference to FIG. 1, which is a flow chart of a process in accordance with the present invention. This process may be performed in a system including some number of processors each having a local memory and capable of performing calculations in parallel. The processors are connected via an inter-processor communication (IPC) network. A master controller, also having a local memory, can communicate with any of the processors via the IPC network. The system also may be connected to a persistent database storage device, which will store the output generated by the process. The process begins at block 101, where a new data element is read from an input stream of data elements.

In some embodiments, the input stream could include edges of a graph, where construction of unique pairs may be performed in order to compute the number of common neighbors shared between two vertices. In other embodiments, the input stream could include a set of items from a database table for which a Cartesian product is needed. In other database applications the "set similarity" is desired from a set of items to determine their commonality. This can help, for example, to disambiguate two people whose names are similar but not exact in the event that they share many of the same previous home residences or phone numbers. Insurance companies also may perform "set similarity" operations to determine whether certain incidents or accidents have something in common.

Processes for finding commonality are used in many applications, but because of the $O(n^2)$ time requirements, such processes must be parallelized to be practical. One advantage of certain embodiments of the present invention is to allow for effective parallelization of processes for generating a Cartesian product, thereby amortizing the $O(n^2)$ time requirement. So $O(n)$ data may be stored in a database table, but performing the unique pairwise combinations may not be feasible in that database. One can then stream the $O(n)$ data to a system employing methods such as are described herein to construct the pairs which can then be provided back to the database for analysis.

The input data stream may be read by the master controller into the master controller's memory, one element at a time. The master controller will thereafter have the initial responsibility for delivering the data element that was read to the appropriate registers. According to some embodiments, the master controller will deliver the data element directly to each register. According to other embodiments, the master controller may deliver the data element directly to a subset of the registers, and those registers may relay the data element to other registers, e.g., registers that are collocated on a single processor or in a physically-local cluster of processors.

In some embodiments, the master controller can be implemented using a single computer processor. However, other embodiments may be implemented differently. For example, a collection of parallel processors may be used to implement the master controller. In such an embodiment, each processor must adhere to the global order of the elements when replicating and assigning elements to registers. The master controller must also avoid race conditions so that storage slots in registers are not inadvertently overwritten before a legitimate pair of elements can be constructed.

The process continues at block 103, where a counter is incremented. The counter may be maintained by the master controller in local memory, and the master controller can use the counter to track the number of data elements that have been read from the stream. This number will also correspond to how many registers have been instantiated.

The process continues at block 105, where a new register is instantiated. The new register is indexed according to the counter that was incremented at block 103. For example, the master controller may use the counter to update a register map in local memory at the master controller, such that the register map uses the counter to define a location of the register that is instantiated in block 105. A register map can be implemented as a hash table on the master controller where each processor can be assigned a register with counter i. The hash table provides a fast mapping so there is no significant cost to the overall computation.

Each register is resident at a particular associated processor. For example, in some embodiments a register may be implemented as a virtual data structure in local memory at a particular processor. The register map may then indicate which processors are responsible for which registers. Multiple registers may be resident at a single processor. It may then be the responsibility of each target processor to keep track of the locations in local memory of each register associated with that processor, in association with the appropriate counter. In other implementations, the register map itself may include memory addressing information and may send messages to the target processors including direct memory addressing information. In some implementations, the register map also may include information regarding routing information defining one or more logical paths through the IPC network, such as a series of logical nodes to be traversed to reach the target processor and register. In other cases, the routing function may be dynamic and/or separately managed by a dedicated routing system.

Each register has at least two words of working memory associated with it for storing data elements. In the extreme case where the number of processors available equals or exceeds the number of data elements to be processed, two words of memory is all that is needed. In many practical applications, however, more memory will be required. In general, $2(n-1)/p$ words of working memory is sufficient to hold the data elements, where n is the total number of data elements to be processed, and p is the number of processors that are available for load balancing. In some applications where the number of processors is less than $n-1$ and each processor has less than $2(n-1)/p$ memory, then the elements at each processor can be stored in a file or database until the time at which the process can load the elements into its memory. The register may be created by the master controller sending a message via a logical pathway defined in the register map, e.g., to a particular target processor. The message may instruct the target processor to create the register, including the necessary local memory at the target processor, including a designated first and second memory location. Additional memory locations may be used to store a queue of data elements awaiting processing for pairing. Each register is uniquely identifiable, which may be accomplished by associating the counter value with the register. Since the counter is incremented before creating each register, each register will have a unique counter value associated with it. It is particularly important that the registers be uniquely identifiable when a target processor is responsible for maintaining multiple registers.

The process continues at block 107, where the new data element read at block 101 is copied into a first memory location associated with the new register. The data element is received at the target processor and stored in the target processor's local memory at the first memory location associated with the register. In some embodiments, the data element may be sent directly from the master controller to the target processor via the IPC network. In other embodiments, the data element may be relayed through one or more other processors to the target processor. The first memory location associated with the register can remain static throughout the remainder of the process, continuing to contain this data element. The responsibility of this register will then be to pair the data element in the first memory location with each additional element that will be provided subsequently. Any pairings of the new data element with data elements that were previously read from the input data stream, however, are handled elsewhere, as is explained below.

The process continues at block 109, where the same new data element is also copied into second memory locations associated with the remaining registers, i.e., each register associated with a value less than the present value of the counter. These operations are independent of the operations performed in blocks 105 and 107, and thus may be performed prior to, following, or at the same time as those operations. The data element may be received by the target processors and directed to the appropriate registers similarly to how data elements are handled in block 107. However, these data elements are not stored in the first memory location, but instead are stored in a second memory location. In embodiments where more than two words of memory are used, the second memory location may include any appropriate number of data elements in a queue structure as may be chosen according to the desired design. However, this is not required so long as pairs are output at least as quickly as new data elements are received.

While in some embodiments master controller may send the data element directly to each register, in other embodiments the work of distributing the data element into the second memory location of all pre-existing registers may be performed partly by the processors responsible for the registers themselves. For example, the processors and registers can use a peer-to-peer communication protocol to distribute the elements to one another, thus alleviating the communication latency between the master controller and the registers. In one example, when a register associated with a value n (i.e., the value of the master controller's counter at the time the register was created) receives a new data element, it may then be responsible for delivering the data element to the register associated with the value $n-1$, which in turn delivers the data element to register $n-2$, and so on. The per-processor memory can be adjusted to meet the constraints of a given system, allowing for a theoretical minimum of two words of memory (in the event that at least one processor is available for each data element), and in environments with fewer processors, disk-based queues, e.g. files stored locally where the responsible register and processor have immediate access to them, can be used to store the elements needed for the unique, pairwise combinations.

The oldest received data element at the second memory location may be the first out of a first-in-first-out queue of data elements for pairing with the data element stored at the first memory location associated with the register. However, other implementations are possible as well, and the order in which elements are chosen from the second memory location may be flexible. What is most important is that each element is used for pairing precisely once, so as to avoid duplicate pairings.

The process continues at block 111, where element pairs are output. For each register, the data element currently residing in that register's first memory location is paired with the data element currently residing in that register's second memory location. Pairs that are thus constructed may be output to a persistent database storage device, such that that database can then successfully process queries that rely on knowledge of whether both elements of a particular element pair were or were not in the original data element stream. According to certain embodiments, it may be that element pairs are stored only if and when they meet certain criteria. For example, an application may filter a pair if the elements themselves are too dissimilar. Another application may filter a pair out if one element of the pair has already reached a threshold count and no further pairings with that element are required. In such cases where pairs are subject to front-end filtering, each element pair may first be analyzed to determine whether it meets the selection criteria, and only if the element pair does meet those criteria it can be passed to the database for storage. By filtering pairs in this fashion, the total database storage space required may be reduced, which also may improve query response times for the database. The process just described with reference to blocks 101 through 111 may be repeated as many times as necessary to read each element of the data element stream in sequence and construct the complete list of element pairs.

The process just described also can be understood with reference to Table 1, below.

TABLE 1

| Steps | Stream | Register 1 | | | Register 2 | | | Register 3 | | | Register 4 | | |
|---|---|---|---|---|---|---|---|---|---|---|---|---|---|
| | | Slot 1 | Slot 2 | Output | Slot 1 | Slot 2 | Output | Slot 1 | Slot 2 | Output | Slot 1 | Slot 2 | Output |
| 1 | Read A | Load A | | | | | | | | | | | |
| 2 | Read B | | Load B | (A,B) | Load B | | | | | | | | |
| 3 | Read C | | Load C | (A,C) | | Load C | (B,C) | Load C | | | | | |
| 4 | Read D | | Load D | (A,D) | | Load D | (B,D) | | Load D | (C,D) | Load D | | |
| 5 | Read E | | Load E | (A,E) | | Load E | (B,E) | | Load E | (C,E) | | Load E | (D,E) |

The example shown in Table 1 illustrates pairwise combinations in streaming data using two words of memory per processor for n−1 processors. In this example, each slot holds at most one element, and the second slot in each register is thus overwritten by each new input. A total of five elements of shown, and Table 1 does not show a new register being loaded with element E, which would not result in any pairing. In practice, it may be the case that when reading data elements from the input stream it is not known immediately whether a particular element is the last element of the input stream. In such a case, in practice, a new, fifth register would be initialized and element E would be loaded into Slot 1 of register E. Since no more elements are received after element E, however, this fifth register would not output any pairs and Slot 2 of this register would never be filled before termination of the process.

The outline of the procedure is as follows, where slots will now denote the location in a register that stores a word of memory. The controller reads the first element and writes it into the first slot of the first register. The controller then reads the second element and writes it into the second slot of the first register and the first slot of second register. The controller reads the third element and writes it into the second slot of the first register, again into the second slot of the second register, and then into the first slot of the third register. The controller proceeds in this fashion for all elements where the i-th element is written into the first slot of the i-th register and then in the second slot of all registers in the interval [1 . . . (i−1)]. The first slot is always populated before a second slot of the same register. Simultaneous to the controller assignment, a processor will pair the elements in the two slots of each register as soon as the second slot is populated with a new value. As illustrated in Table 1, ten unique pairs are output for the set {A,B,C,D,E} and each slot can hold at most one element. Each row corresponds to the operations that are simultaneously completed in a single step where the replication of elements to each register is implicitly handled by a controller. Also note that the illustration specifically employs four processors but could have also employed just one processor having four, two-word registers and four threads to perform the simultaneous pairing. The number of processors is not restricted, allowing flexibility in the memory requirement per processor. Thus, if there are n=1025 elements and p=8 processors, then each processor requires 256 words of memory.

The procedure can be extended to distributed-computing environments where files are used for queuing the replicated elements while under the same streaming data constraints as before, and additionally each processor requires only two words of memory. In such a platform, the controller creates a file for each new element from the input stream and writes the element to that file. The controller then writes that element to all other existing data files in the system in the same manner as was described previously for writing elements into the slots of registers. The files are distributed across the system where each processor in a system can operate on more than one file. The distribution of the files can be maintained by a file system that adequately load-balances the files. The number of processors, p, can be fixed and be less than n−1, so that each processor requires no more than O(n) memory and as little as two words of memory. The files are read in a streaming manner by a processor without guarantee of random access to file contents or the ability to re-read a file.

A processor opens a file and stores the first element in the file into the first word of memory. The processor then reads the next element in the file and stores into the second word of memory, and then outputs a new pair from the elements in the two words of memory. All subsequent reads from the file will overwrite the contents of the second word of memory. A controller can continue to write data into a file that has been opened by a processor. The processor will wait until a controller writes a character that denotes the End-of-File (EOF) or closes the file. Once a file has been closed the processor can continue processing another file. All reads and writes can be performed in parallel in such a system.

Depending on the embodiment, certain acts, events, or functions of any of the methods described herein can be performed in a different sequence, can be added, merged, or left out altogether. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, block, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

I claim:

1. A computer-implemented method of constructing pairwise combinations of data elements received from an input data stream, in a system logically coupled to a persistent database storage device, the system comprising 1) a plurality of parallel processors each having a local memory, 2) an inter-processor communication (IPC) network, and 3) a master controller having a local memory and logically coupled to the plurality of parallel processors via the IPC network and also configured to receive data from the input data stream, the method comprising:

for each data element of the input data stream:
  a) at the master controller, reading the data element from the input data stream into the master controller's local memory;
  b) at the master controller, incrementing a counter, i, where the counter i is stored in the master controller's local memory;
  c) instantiating a register holding at least two words of memory and corresponding to the counter i by:
    updating a register map at the master controller, such that the register map defines, in association with a value of the counter, at least one logical pathway through the IPC network between the master controller and a target processor of the plurality of parallel processors associated with the register; and
    sending a message from the master controller to the target processor via the logical pathway defined in the register map, the message instructing the target processor to create the register in the local memory at the target processor, the register including a first memory location in the local memory at the target processor, a second memory location in the local memory at the target processor, and an index corresponding to the value i;
  d) at the target processor, receiving the data element from the master controller via the IPC network and copying the data element into the first memory location of the register corresponding to i;
  e) for every other register in the register map corresponding to a value less than i, at the processor associated with that other register:
    receiving the data element from the master controller via the IPC network and copying the data element into the second memory location of that other register corresponding to that value less than i; and
    outputting a unique pair, constructed from the data elements stored at the first and second memory locations, to the persistent database storage device.

2. A method in accordance with claim 1, wherein in e), each register that receives a data element receives the element from a source register having a higher corresponding value.

3. A method in accordance with claim 1, wherein the master controller comprises a plurality of parallel processors and steps a) through e) are performed in parallel for multiple elements of the input data stream by the plurality of parallel processors.

* * * * *